Figure 1:
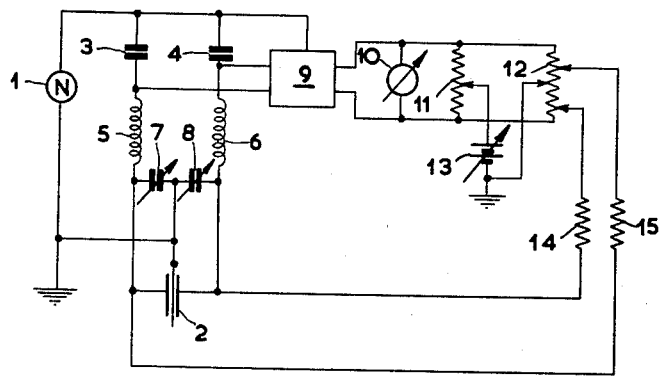

Dec. 4, 1962　　　J. J. OPSTELTEN ETAL　　　3,066,536
APPARATUS FOR MEASURING LOW PRESSURES
Filed Feb. 16, 1959

INVENTORS
JOHANNES OPSTELTEN
NICOLAAS WARMOLTZ
JOHANNES JACOBUS ZAALBERG VAN ZELST
BY
AGENT

United States Patent Office 3,066,536
Patented Dec. 4, 1962

3,066,536
APPARATUS FOR MEASURING LOW
PRESSURES
Johannes Jacobus Opstelten, Nicolaas Warmoltz, and Johannes Jacobus Zaalberg van Zelst, all of Eindhoven, Netherlands, assignors to North American Philips Company Inc., New York, N.Y., a corporation of Delaware
Filed Feb. 16, 1959, Ser. No. 793,446
Claims priority, application Netherlands Feb. 21, 1958
2 Claims. (Cl. 73—398)

This invention relates to apparatus for measuring low pressures using differential capacitors comprising two fixed plates and a plate adapted to be moved between the fixed plates which is directly influenced by the medium whose pressure is to be determined, provision being made of an alternating voltage source, the voltage of which is modulated in accordance with the capacitance variations of the differential capacitor, the direct voltage produced by demodulation acting as the indicating voltage for the pressure to be measured.

In such devices, known as diaphragm manometers, the intermediate plate is designed as a diaphragm having a thickness of, say, 20 microns, which forms the partition between two chambers one of which contains the medium the pressure of which is to be ascertained. In the other chamber a constant pressure prevails. The pressure determination amounts to a determination of the difference of the pressure in the two chambers. The diaphragm can be made of stainless steel and bends under the influence of the pressure difference. The flexure of the diaphragm is assumed to be a measure of the pressure difference if the latter exceeds, say, 1 mm. of mercury. Owing to the bending the capacitances between the diaphragm and the fixed plates arranged on both sides thereof are varied. These capacitance variations can be measured by including the capacitances in two interconnected arms of a Wheatstone bridge at one of the diagonal arms of which the constant voltage supplied by the alternating voltage source is set up. The frequency of this voltage generally is of the order of 500 kc./s. The alternating voltage which is set up across the diagonal arm and is modulated in accordance with the capacitance variations, and according to one method is demodulated and the resulting demodulated voltage is applied to a measuring instrument which serves as an indicator.

For measuring lower pressure differences, a zero method is preferably used, alone or in combination with the aforedescribed method, in which the diaphragm is retracted electrostatically to the zero position under the action of direct voltages supplied to the fixed plates in such a manner that a substantially linear relationship exists between the voltage applied and the pressure difference, i.e. the pressure to be measured. For example, in one particular circuit arrangement of the prior art utilizing the zero method, in the absence of a pressure difference, the fixed plates are spaced from the grounded diaphragm by given distances of which in the case of diaphragm manometers having symmetrical geometrical dimensions will be substantially equal and, for example, of the order of 25 microns. In some of these prior art circuit arrangements, if it is desired to increase the sensitivity of the diaphragm manometer, each of the two plates may have a certain bias voltage $V_0$ with respect to the diaphragm applied to them and which in the aforementioned case of symmetrical dimensioned diaphragm manometers are also made substantially equal. At a certain pressure difference $p$, the diaphragm is displaced or moved from the zero or neutral position by this pressure difference and, as a result of which, the voltage of the capacitor plate at the pressure side is increased by an amount $v$ while the pressure of the capacitor plate at the other side (vacuum side) is reduced by the same amount $v$. To return the diaphragm to the zero position, voltages are applied between the respective plates and the diaphragm with a magnitude and polarity which restore the electrostatic balance. The difference voltage between these two voltages is directly proportional to the electrostatic force required to restore the electrostatic balance and return the diaphragm to the zero position. In doing so, the deflection or bending of the diaphragm caused by the presence of the pressure difference is overcome, and, hence, the difference voltage is likewise directly proportional to the pressure difference causing the deflection. The return of the diaphragm to the zero position is indicated on the indicator. Under the circumstances of mechanical and electrical symmetrical construction, there exists a linear relationship $p=CV_0v$. In one such system of the prior art employing the zero method, the difference voltage is read from a potentiometer from which the voltages $v$ are taken and applied between the respective plates and diaphragm as aforedescribed.

In other prior art systems, the voltages $v$ can also be produced automatically by the demodulator, for at the output of the demodulator a voltage appears which is substantially proportional to the bending of the diaphragm. From this there can be derived voltages which are balanced with respect to earth and can be used for a similar purpose, and are applied by, suitable inverse feedback means, between the respective plates and diaphragm. In these latter described systems, the diaphragm need not exactly be returned to the zero position; however, the reading of the indicator instrument still is in linear relationship with the pressure difference in the two chambers.

Similarly, the zero-method may also be utilized to measure low pressures in diaphragm manometers having asymmetrical mechanical and/or electrical constructions, in which case the aforementioned linear relations is approximately true, especially where the pressure differences are quite low.

In all of the aforementioned bilateral diaphragm manometers and also in diaphragm manometers having only one fixed plate, an error can occur in determining the pressure of media, more particularly vapours, which have a permanent dipole moment with associated absorption phenomena at the surfaces of the plates. As a result the apparent dielectric constant of the medium is increased. The resulting error is not due primarily to a variation of the attraction between the plates owing to the variation of the dielectric constant, but is due to the fact, that, especially if the diaphragm is not retracted exactly to the zero position, the modulation depth of the high-frequency voltage depends upon the dielectric constant. Hence, the indication of the instrument is no longer an exact measure of the pressure difference. It is an object of the present invention to obviate this disadvantage.

In the bilateral diaphragm manometer described, this can be ensured in that in accordance with the invention only the capacitance between the diaphragm and the electrode of the differential capacitor at the vacuum side thereof is used for effecting the modulation of the alternating voltage. The term "vacuum side" as used herein is to be understood to mean the chamber in which the pressure is not measured. The said absorption phenomena can readily be avoided so that they do not influence the modulation of the alternating voltage any more.

Preferably, the bridge arms in which the capacitances of the differential capacitor are connected, are tuned to the frequency of the alternating voltage source by means of inductances connected in series with the said capacitances, in which event it will generally be necessary to connect identical variable capacitances in parallel with the said capacitances. In one embodiment of an apparatus in accordance with the invention, one capacitance of the differential capacitor is rendered inoperative for effecting the modulation by connecting the said fixed electrode, through a high resistance, to the other end of the inductance connected in series and by connecting, in parallel with the associated variable capacitance, a fixed capacitance which is substantially equal to the mean capacitance of each of the parts of the differential capacitor. Thus, the said capacitance of the differential capacitor situated at the pressure side thereof is no longer connected in the bridge circuit proper.

Figure 2:
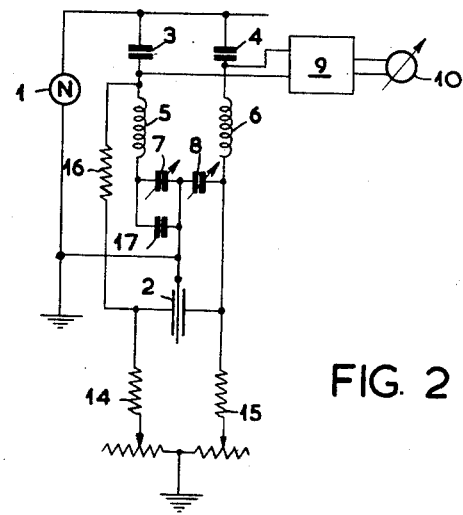

In order that the invention may readily be carried out, an embodiment thereof will now be described, by way of example with reference to the accompanying drawings, in which FIG. 1 shows the circuit arrangement of a known apparatus and FIG. 2 shows the modification thereof in accordance with the invention.

In FIG. 1, reference numeral 1 denotes an oscillator having a frequency of, say, 500 kc./s., the voltage of this oscillator being amplitude-modulated owing to the bending of the diaphragm of a differential capacitor 2. It is assumed that the chamber formed by the diaphragm and the right-hand fixed plate of the differential capacitor is the vacuum side, while the other chamber communicates with the chamber in which the pressure to be measured obtains. The capacitances of the differential capacitor form part of a bridge arrangement two arms of which comprise the capacitors 3 and 4, the other arms comprising the said capacitances which are each connected in series with an inductance 5 and 6 respectively, provision being made of variable parallel capacitors 7 and 8 by means of which the said arms can be tuned to the oscillator frequency. The second diagonal arm of the bridge at which a voltage is set up which is modulated in accordance with the pressure difference, is connected to an amplifier 9 which is also a demodulator in which a phase-sensitive demodulation of the amplified modulated voltage is effected. As a result there is produced at the output of this amplifier a direct voltage the polarity of which depends upon the direction in which the diaphragm is deflected. This voltage can be read from a direct-current instrument 10. Provision is further made of a potentiometer 11, the middle of which is connected to earth through a direct-voltage source 13 of constant, adjustable voltage and of a potentiometer 12 which is connected in parallel with the potentiometer 11 and the middle of which is directly connected to earth. From potentiometer 12 there are taken, at points situated symmetrically with respect to its middle, voltages which are derived from the demodulated voltage, which appears across the resistor 11, and which are applied, through resistors 14 and 15, to the fixed electrodes of the differential capacitor. The polarities of the applied voltages are such that the movable plate is always pulled into its initial position. Thus a linear indication is obtained. The operation of the circuit of FIG. 1 is similar to that described for the device disclosed in the copending United States patent application, Serial No. 662,226, filed by the co-inventors herein on May 28, 1957 and entitled "Device for Measuring Low Pressures."

Alternately, the diaphragm of the differential capacitor 2 may be returned to its zero or initial position by adjustment of the potentiometer 12, in which case the potentiometer 12 may be disassociated, if desired, with the demodulated voltage appearing across the resistor 11. Under these conditions, adjustment of the potentiometer 12, as mentioned hereinabove, returns the diaphragm to the zero position.

When measuring the pressures of vapours having permanent dipole moments, the above-mentioned disadvantages would occur. This would also be the case in an apparatus in which the moving plate is not automatically returned to its initial position by means of symmetrical voltages which are taken from a manually adjustable potentiometer, the potentiometer adjustment being a measure of the pressure difference to be measured. Therefore, according to the invention, the apparatus is modified so that the capacitance between the diaphragm and the left-hand plate is no longer of any importance. This can be effected in the manner shown in FIG. 2.

In this figure, parts corresponding to those shown in FIG. 1 are designated by like reference numerals. For the sake of brevity, the diaphragm of the capacitor 2 in the apparatus of FIG. 2 is illustrated as being returnable to its zero position by adjustment of potentiometer means illustrated, by way of example only, as being disassociated with the demodulated output voltage. However, it is to be understood that this invention may be utilized in any of the aforedescribed apparatus in which the zero method is employed. Thus, according to the invention, in the embodiment of the apparatus of FIG. 2 selected by way of example to illustrate the principles of our invention, the left-hand plate of the capacitor is connected, through a large resistor 16 of, for example, 1 megohm, to the junction of the capacitor 3 and the inductance 5, a fixed capacitance 17 being connected in parallel with the capacitor 7. This fixed capacitance is about equal to the mean capacitance of each of the two halves of the differential capacitor. Thus, the balanced condition of the bridge is hardly changed, however, the capacitance corresponding to the pressure side has substantially no influence on the modulation.

Thus, while we have described above the principles of our invention in connection with specific apparatus, it is to be clearly understood that this description is made only by way of example and not as a limitation to the scope of our invention as set forth in the objects thereof and in the accompanying claims.

What is claimed is:

1. A circuit arrangement for measuring relatively low pressures, comprising a differential capacitor having first and second electrodes and an intermediate electrode, said intermediate electrode being movable from a substantially central position relative to said first and second electrodes in accordance with the pressure to be measuerd, input means for an alternating voltage of given frequency, a first series circuit resonant at the frequency of said alternating voltage and comprising a first capacitor, a first inductor and said first and intermediate electrodes, a second series circuit resonant at the frequency of said alternating voltage and comprising a second capacitor, a second inductor and a third capacitor, a third series circuit comprising a relatively large resistance element and said second and intermediate electrodes, said third circuit being connected in shunt with said second inductor and said third capacitor, means for applying the alternating voltage to said first and second series circuits, means coupled to the junction of said first capacitor and first inductor and to the junction of said second capacitor and second inductor for deriving a modulated alternating voltage having variations as determined by variations of the position of the intermediate electrode relative to said first and second electrodes, signal detector means for producing from said modulated alternating voltage a detector voltage having amplitude variations as determined by variations of the modulated alternating voltage, means for indicating the variations of said detector voltage, means for applying a potential difference between said intermediate electrode and said first and second electrodes thereby to bias the intermediate electrode with respect to the first and second electrodes, means for deriving an inverse feedback voltage from the detector voltage and for applying the feedback voltage in opposite polarity respectively to the first and second electrodes.

2. A circuit arrangement for measuring relatively low pressures, comprising a differential capacitor having first and second electrodes and an intermediate electrode, said intermediate electrode being movable from a substantially central position relative to said first and second electrodes in accordance with the pressure to be measured, input means for an alternating voltage of given frequency, a first series circuit resonant at the frequency of said alternating voltage and comprising a first capacitor, a first inductor and said first and intermediate electrodes, a first variable capacitor connected in shunt with the first and intermediate electrodes, a second series circuit resonant at the frequency of said alternating voltage and comprising a second capacitor, a second inductor and a second variable capacitor, a third capacitor connected in shunt with said second variable capacitor and having a capacitance substantially equal to the capacitance between said second and intermediate electrodes, a third series circuit comprising a relatively large resistance element and said second and intermediate electrodes, said third circuit being connected in shunt with said second inductor and second variable capacitor, means for applying the alternating voltage to said first and second series circuits, means coupled to the junction of said first capacitor and first inductor and to the junction of said second capacitor and second inductor for deriving a modulated alternating voltage having variations as determined by variations of the position of the intermediate electrode relative to said first and second electrodes, signal detector means for producing from said modulated alternating voltage a detector voltage having amplitude variations as determined by variations of the modulated alternating voltage, means for indicating the variations of said detector voltage, means for applying a potential difference between said intermediate electrode and said first and second electrodes thereby to bias the intermediate electrode with respect to the first and second electrodes, means for deriving an inverse feedback voltage from the detector voltage and for applying the feedback voltage in opposite polarity respectively to the first and second electrodes.

References Cited in the file of this patent
UNITED STATES PATENTS

| | | |
|---|---|---|
| 2,567,253 | Strange et al. | Sept. 11, 1951 |

FOREIGN PATENTS

| | | |
|---|---|---|
| A16,792 | Germany | July 5, 1956 |
| 1,156,845 | France | Dec. 23, 1957 |